Apr. 3, 1923.

L. R. PIETRAS 1,450,332

MOTOR DRIVEN SLED

Filed Mar. 30, 1921

Inventor
L. R. Pietras
By his Attorney

Apr. 3, 1923.
L. R. PIETRAS
MOTOR DRIVEN SLED
Filed Mar. 30, 1921
1,450,332
2 sheets-sheet 2
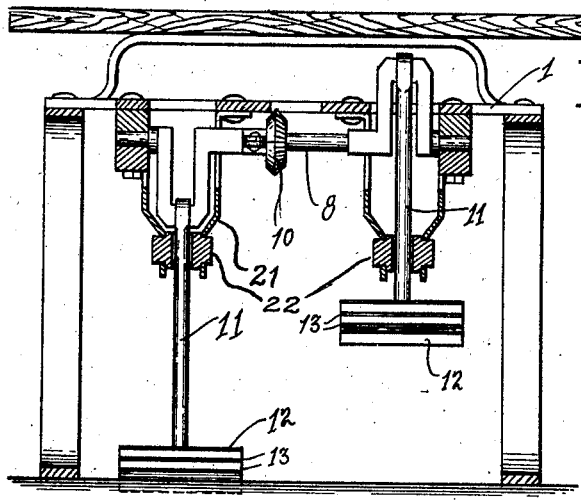
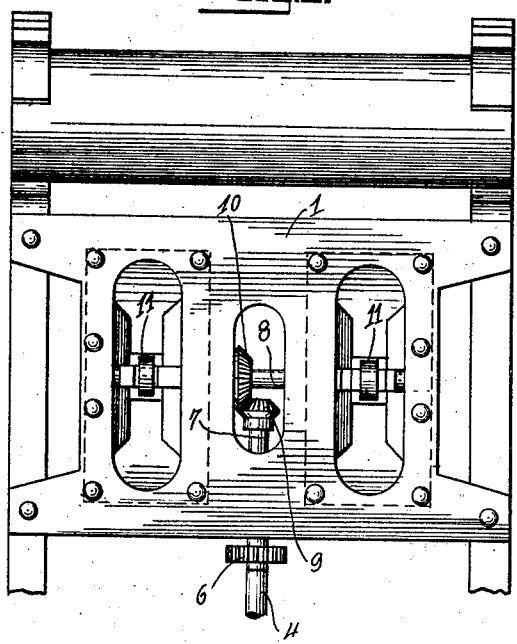
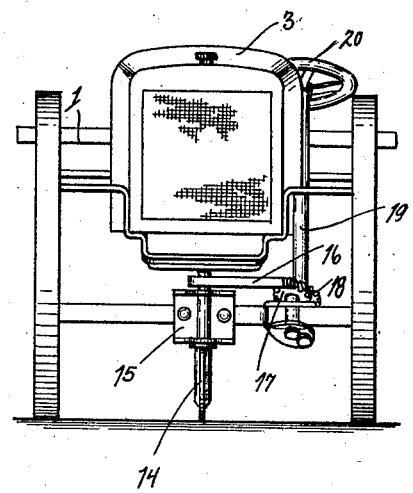
Inventor
L. R. Pietras
By his Attorney
W. Palm Patented Apr. 3, 1923.

1,450,332

UNITED STATES PATENT OFFICE.

LUDWIK R. PIETRAS, OF JOLIET, ILLINOIS.

MOTOR-DRIVEN SLED.

Application filed March 30, 1921. Serial No. 456,826.

*To all whom it may concern:*

Be it known that I, LUDWIK R. PIETRAS, a citizen of Poland, residing at Joliet, in the county of Will and State of Illinois, have invented certain new and useful Improvements in Motor-Driven Sleds, of which the following is a specification.

The main object of this invention is the provision of a motor driven sled having novel means for propulsion and for steering.

The above object will become apparent in the description below, in which similar characters of reference refer to like-named parts in the drawings, in which—

Figure 3 is a front elevational view thereof.

Figure 4 is a cross-sectional view taken on a vertical plane passed thru the crank shaft bearings.

Figure 5 is a fragmentary plan view of the rear of the sled.

Figure 1:
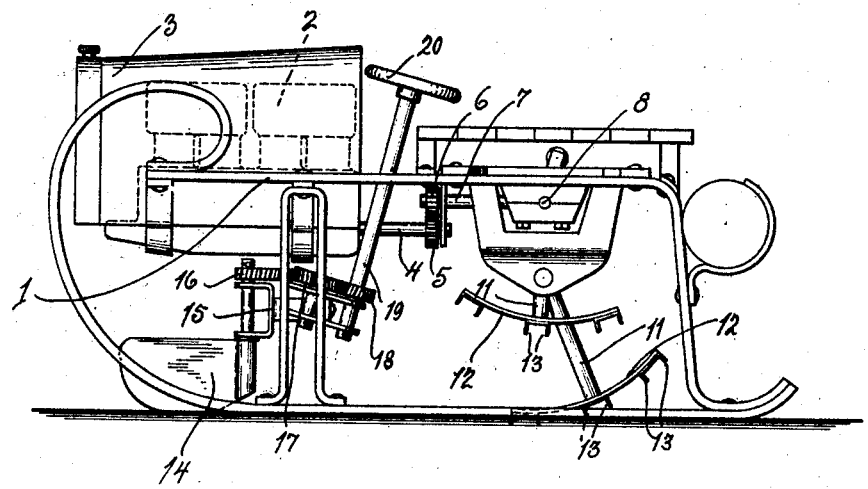
Fig. 1 is a side elevational view of the invention.
Figure 2:
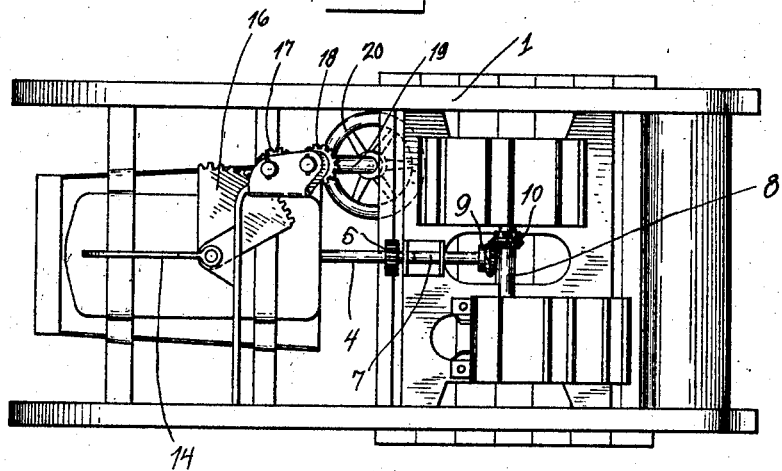
Figure 2 is an underside plan view of the same.

Referring in detail to the drawings, the numeral 1 represents the frame of the sled generally and 2 the motor supported therein. The motor is surrounded and protected by the usual hood 3. A horizontal shaft 4 extends from the motor rearward and drives a second shaft 7, thru the media of gears 5 and 6.

A crank shaft 8 is mounted in bearings 21 attached to the frame 1 at right angles to the shaft 7 and is driven by the latter thru the media of bevel gears 9 and 10. Rods or walking beam connections 11 engage the cranks of said crank shaft and are provided at their free ends with arcuate shoes 12, the weight of the shoes and the rods tending to retain these parts downwardly and the rods are directed by pintled guides 22, carried in the brackets 21 and through which the rods slidably operate. Relatively sharp teeth 13 extend from the undersurfaces of the shoes, whereby the latter are prevented from slipping on the ice or snow.

A rudder 14 is rotatably mounted in a bracket 15 rigid with the frame 1, and a train of gears including the sector 16, skew gears 17 and 18 actuates the same the gear 18 being rigid upon a steering rod 19 at the upper end of which a common steering wheel 20 is mounted.

In operation, it is apparent that, as the motor drives the shaft 4, power is transmitted to the shaft 7, which in turn rotates the crank shaft 8. Thus the shoes 12 will alternately rise and fall and at the same time move forward, somewhat after the fashion of a person walking. Each time that a shoe reaches the ice or snow, the teeth 13 will bite into the same so that the sled will be forced forward, as appears in the illustration in Fig. 1.

It is also readily apparent, in steering the sled, it is but necessary to turn the handle or wheel 20 in the desired direction, and thru the media of the gears and sectors shown, the rudder 14 will be turned so as to steer the device in the desired direction.

Having thus described my invention what I claim as new and seek to secure by Letters Patent, is:—

A vehicle propelling mechanism comprising a frame, a power driven shaft mounted therein, a pair of cranks on said shaft, casings attached to said frame at the sides of said cranks and extending therebelow, connecting rods engaging said cranks, guide bearings for said rods, said bearings being pivotally carried by adjacent pairs of said casings parallel with said shaft, and curved shoes fixed on the free ends of said rods, said shoes having teeth on their outer convex faces adapted to engage the surface over which the vehicle travels.

In witness whereof I affix my signature.

LUDWIK R. PIETRAS.